(12) United States Patent
Skoog et al.

(10) Patent No.: US 6,720,034 B2
(45) Date of Patent: Apr. 13, 2004

(54) METHOD OF APPLYING A METALLIC HEAT REJECTION COATING ONTO A GAS TURBINE ENGINE COMPONENT

(75) Inventors: Andrew Jay Skoog, West Chester, OH (US); Jane Ann Murphy, Franklin, OH (US); John Frederick Ackerman, Laramie, WY (US); Paul Vincent Arszman, Cincinnati, OH (US); Bryan Thomas Bojanowski, Cincinnati, OH (US); Timothy Ray Lattire, Sunman, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/131,518

(22) Filed: Apr. 23, 2002

(65) Prior Publication Data

US 2003/0198750 A1 Oct. 23, 2003

(51) Int. Cl.⁷ .............................. B05D 1/36; B05D 3/02; B05D 1/02
(52) U.S. Cl. .................. 427/419.1; 427/402; 427/419.2; 427/421; 427/427; 427/429; 427/376.1; 427/376.2; 427/376.6; 427/383.3; 427/383.5; 427/383.7; 427/327
(58) Field of Search .............................. 427/402, 419.1, 427/419.2, 421, 427, 429, 376.1, 376.2, 376.6, 383.3, 383.5, 383.7, 327

(56) References Cited

U.S. PATENT DOCUMENTS

| | | | |
|---|---|---|---|
| 3,972,475 A | | 8/1976 | Nelson et al. |
| 4,163,736 A | | 8/1979 | Acres et al. |
| 4,399,199 A | | 8/1983 | McGill et al. |
| 4,676,994 A | * | 6/1987 | Demaray .................. 427/566 |
| 4,877,647 A | * | 10/1989 | Klabunde .................. 427/123 |
| 5,167,869 A | * | 12/1992 | Nebe et al. .................. 252/514 |
| 5,407,705 A | * | 4/1995 | Vakil .................. 427/255.21 |
| 5,545,437 A | * | 8/1996 | Nagaraj et al. .................. 427/404 |
| 5,584,173 A | * | 12/1996 | Lybarger .................. 60/797 |
| 5,753,317 A | * | 5/1998 | Law et al. .................. 427/487 |
| 5,851,679 A | | 12/1998 | Stowell et al. |
| 6,007,919 A | | 12/1999 | Skoog et al. |
| 6,177,186 B1 | | 1/2001 | Skoog et al. |
| 6,210,791 B1 | * | 4/2001 | Skoog et al. .................. 428/325 |
| 6,455,167 B1 | * | 9/2002 | Rigney et al. .................. 428/472.2 |

OTHER PUBLICATIONS

Engelhard Corp., Material Safety Data Sheet for Liquid Metal A4841, 8 pages, Mar. 31, 2001.
Engelhard Corp., Material Safety Data Sheet for Spray Platinum for Ceramics APP101A, 9 pages, Oct. 15, 1999.
Engelhard Corp., Material Safety Data Sheet for Liquid Bright Gold for Spraying 991BD, 7 pages, Dec. 13, 1999.

* cited by examiner

Primary Examiner—Michael Barr
(74) Attorney, Agent, or Firm—Gregory O. Garmong; K. Scott O'Brian; McNees Wallace & Nurick LLC

(57) ABSTRACT

A heat-rejection coating is applied to a metallic component of a gas turbine engine, preferably made of a nickel-base superalloy. A component surface is preferably pre-treated, as by polishing the component surface, thereafter pre-oxidizing the component surface, and thereafter applying a ceramic barrier coating onto the component surface. A reflective-coating mixture is air sprayed onto the pre-treated component surface. The reflective-coating mixture includes a metallic pigment, such as platinum, gold, palladium, and alloys thereof, and a reflective-coating-mixture carrier. The component with the reflective-coating mixture sprayed thereon is fired.

16 Claims, 7 Drawing Sheets

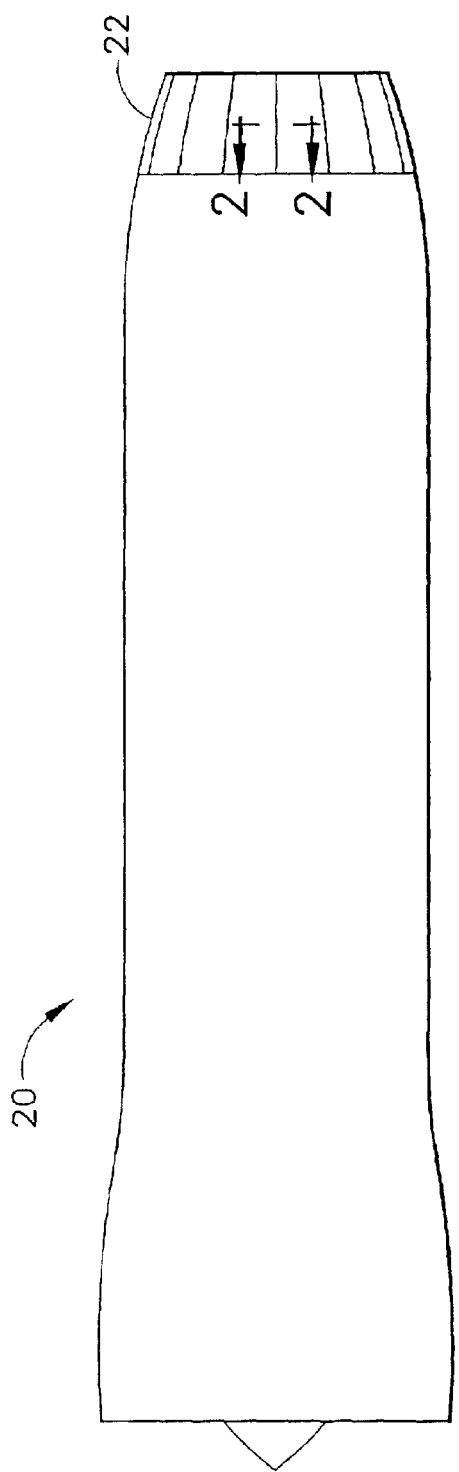
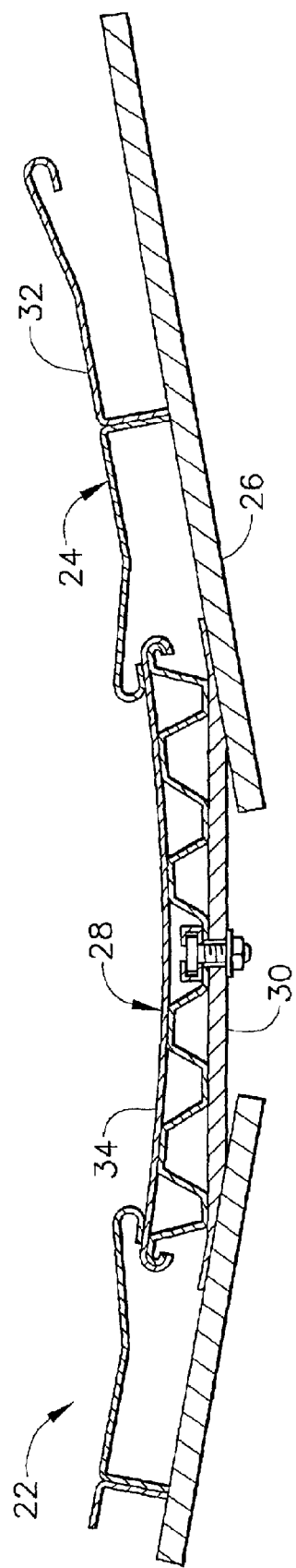

FIG. 8 AS RECEIVED R41 + TOP COAT + BARRIER COAT IN FIRED CONDITION

METHOD OF APPLYING A METALLIC HEAT REJECTION COATING ONTO A GAS TURBINE ENGINE COMPONENT

This invention relates to the coating of articles and, more particularly, to an economical, effective approach for coating aircraft gas turbine parts to reject heat and thereby reduce thermal fatigue failures to help meet life objectives without using additional cooling air.

BACKGROUND OF THE INVENTION

In an aircraft gas turbine (jet) engine, air is drawn into the front of the engine, compressed by an axial-flow compressor, and mixed with fuel. The mixture is combusted, and the resulting hot combustion gases are passed through an axial-flow turbine. The flow of gas turns the turbine by contacting an airfoil portion of the turbine blade, which in turn provides power to the compressor. The hot exhaust gases flow from the back of the engine, driving it and the aircraft forward.

A continuing trend is to increase the operating temperature of the gas turbine engine, as higher temperatures lead to greater thermodynamic efficiency. The ability of the engine to operate at ever-higher temperatures is limited by the materials used in the engine. A variety of techniques are used to achieve increased operating temperatures of the materials. Improved materials with inherently higher operating temperatures are developed. New processing techniques, such as directional solidification and improved heat treatments are utilized. Bleed-air cooling by air directed from the compressor to the hot sections of the engine is widely used.

Coatings are also important contributors to the increased temperature capability of modern gas turbine engines. Environmental coatings inhibit corrosive damage to the coated articles, allowing them to operate in environments, such as the high-temperature corrosive combustion gas, for which they would otherwise be unsuited. Ceramic thermal barrier coatings, usually overlying environmental coatings that serve as bond coats, serve as insulation layers.

Another type of coating is a layer of an optically reflective material that reflects a portion of the incident radiative heat loading away from the coated article. This type of heat-reflective and heat-rejection coating may be made of a metal or a ceramic adhered to the surface of the protected article. The drawbacks of these coatings are that they are relatively expensive to apply and may adversely affect the properties of the underlying substrate article upon which they are deposited. Additionally, it is difficult to apply the coatings to large articles.

There is a need for an approach to applying heat-reflective coatings that may be readily and inexpensively utilized both for newly made and repaired/refurbished articles, and which does not adversely affect the underlying substrate articles upon which the coatings are applied. The present invention fulfills this need, and further provides related advantages.

BRIEF SUMMARY OF THE INVENTION

The present invention provides a heat-rejection coating that is readily and inexpensively applied to a metallic substrate article such as a superalloy article. The heat-rejection coating aids in preventing heating of the article by reflecting incident radiant energy. The present approach is readily utilized with large articles that do not fit into the deposition chambers required for prior approaches.

A method of applying a heat-rejection coating comprises the steps of supplying a metallic component of a gas turbine engine, air-assisted spraying a reflective-coating mixture onto the component, the reflective-coating mixture comprising a metallic pigment and a carrier, and firing the component having the reflective-coating mixture thereon to form a reflective coating on the component.

The component to which the reflective coating is applied is most preferably made of a nickel-base superalloy. Examples of components to which the coating may be applied include an exhaust nozzle convergent flap, an exhaust nozzle convergent seal, and parts that experience radiation in the combustion and exhaust systems.

The reflective-coating mixture desirably includes the metallic pigment in the form of finely divided particles and/or metal salts which precipitate atomic size metal particles of a metal such as platinum, gold, palladium, or alloys of these metals such as platinum-rhodium alloys. The carrier is a liquid that allows the metallic pigment to flow through the air-spray system and then aids in initially adhering the metallic pigment to the surface of the component prior to firing. Organic carriers are preferred.

The reflective coating is quite thin, both to conserve the expensive metal and to avoid a coating that adversely affects the properties of the underlying component. Because the reflective coating is thin, it is preferred to specify its quantity by a real weight rather than by thickness. Most preferably, the reflective coating is present in an amount of from about 0.00275 to about 0.00475 grams per square inch of the component surface being cooled.

Preferably, the component surface is pre-treated prior to the application of the reflective-coating mixture, so that the reflective-coating mixture is air sprayed onto the pre-treated surface. Pre-treatments include one or more of (a) polishing the component surface, (b) pre-oxidizing the component surface, (c) vapor depositing an oxide barrier coating, and (d) applying a ceramic barrier coating onto the component surface and thereafter drying the ceramic barrier coating. Most preferably, pre-treatments (a), (b), and (d) are used together, in the indicated order.

The ceramic barrier coating, where used, is preferably applied by air-assisted spraying a ceramic-barrier-coating mixture onto the surface of the component, and then drying the ceramic-barrier-coating mixture to form the ceramic barrier coating. The ceramic barrier coating is preferably supplied as the ceramic-barrier-coating mixture of particles of a ceramic material such as lanthanum and cerium, dispersed in a ceramic-barrier coating carrier such as an organic liquid. The ceramic barrier coating, where used, is desirably thin. The reflective coating and the ceramic barrier coating are preferably together present in an amount of from about 0.00325 to about 0.0625 grams per square inch of the component surface being cooled.

The reflective coating and, preferably, the ceramic barrier coating are both applied by air-assisted spraying. Air-assisted spraying is a technique comparable to the familiar spraying of ordinary paint, and is typically performed at room temperature using an air-spray-gun type of device. The material to be sprayed, here the reflective coating and possibly the ceramic barrier coating, are not significantly heated during the spray process (although they are heated subsequently in the firing step). Air-assisted spraying is to be contrasted with other spray techniques used to deposit other types of coatings in the gas turbine industry, such as vacuum plasma spraying and air plasma spraying, which are not within the scope of the invention. Plasma spray techniques are performed by heating the material to be sprayed to high temperatures and then forcing the heated material against the surface with a flow of the spray gas. Air-assisted spraying is also to be contrasted with other types of deposition techniques such as chemical vapor deposition, physical vapor deposition, and electrodeposition, all of which require complex deposition apparatus, and all of which are not within the scope of the invention. Most of these other application techniques are limited as to the size of the articles that may be readily coated, because they require special chambers or other types of application apparatus. Air-assisted spraying, on the other hand, is not limited by these considerations, and therefore may be readily used on a wide variety of sizes and shapes of components.

Other room-temperature application techniques such as airless spray, brushing, and application by a decal transfer method may also be used in the present approach.

The present approach may be used to deposit an alloyed metallic coating, as distinct from a pure metallic coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is an elevational view of a gas turbine engine;

FIG. 2 is an enlarged schematic sectional view of the gas turbine engine of FIG. 1, showing a variable-geometry-exhaust-nozzle;

DETAILED DESCRIPTION OF THE INVENTION

Figure 3:
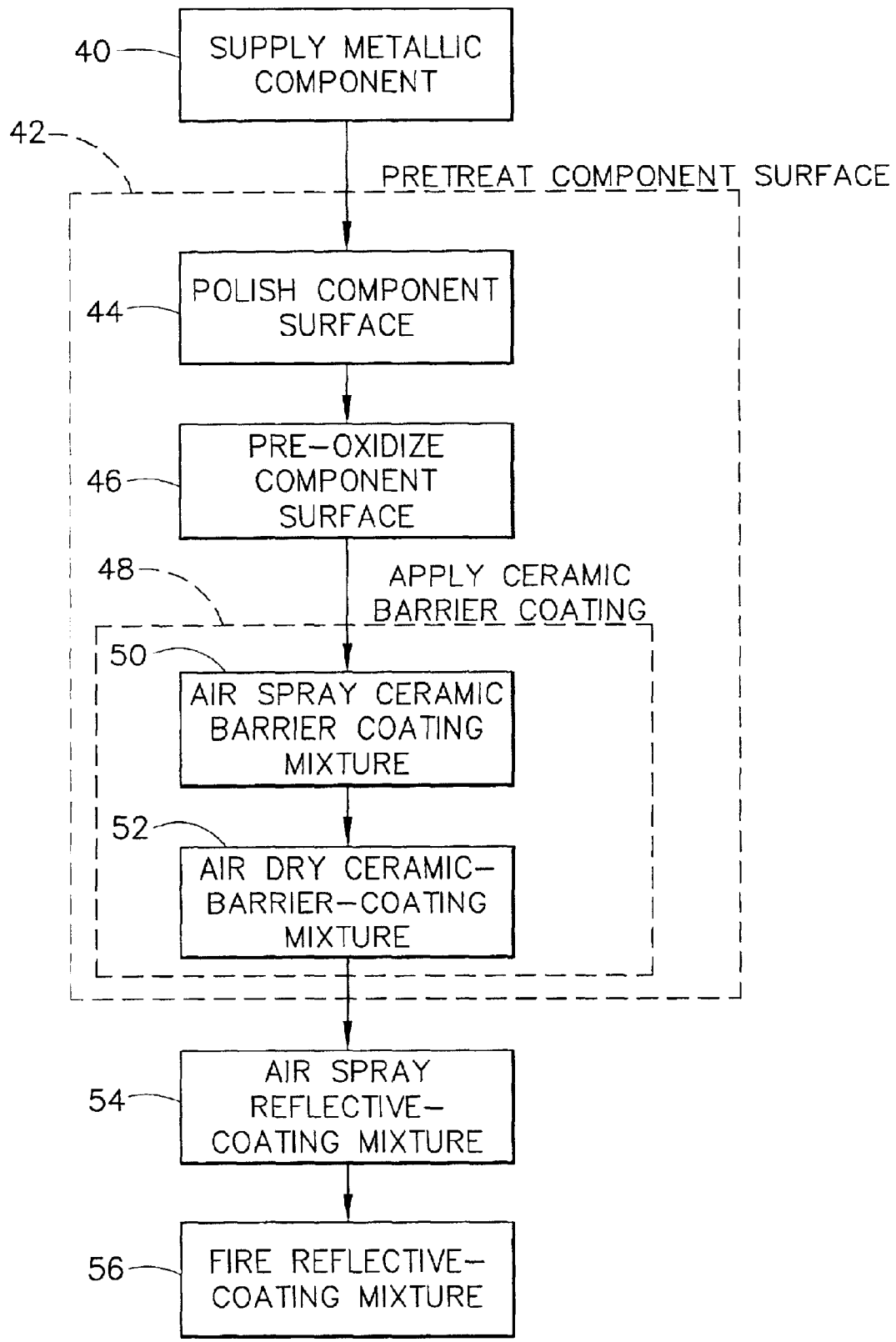
FIG. 3 is a block flow diagram of a preferred approach for practicing the invention.

FIG. 1 is an elevational view of a gas turbine engine 20 with a variable-geometry exhaust nozzle 22, a portion of which is shown in greater detail in the sectional view of FIG. 2. The exhaust nozzle 22 includes an exhaust nozzle convergent flap 24 and its support 26, and an exhaust nozzle convergent seal 28 and its support 30. This structure extends around the entire circumference of the exhaust nozzle 22. The exhaust nozzle convergent flaps 24 are pivoted inwardly and outwardly to controllably alter the area of the exhaust nozzle, and the exhaust nozzle convergent seals 28 prevent combustion gas leakage between the exhaust nozzle flaps 24. Variable-geometry exhaust nozzle 22 structures of this and other types are known in the art, and FIGS. 1–2 illustrate only the elements of the structure pertinent to one application of the present invention.

The exhaust nozzle convergent flaps 24 and exhaust nozzle convergent seals 28 are heated by the contact of the hot combustion gas flowing through the variable-geometry exhaust nozzle 22, when they are pivoted inwardly to reduce the area of the exhaust nozzle. In a typical case, the inwardly facing surfaces of the exhaust nozzle convergent flaps 24 and the exhaust nozzle convergent seals 28 may reach temperatures as high as 1800° F., absent the heat-rejection coating of the present invention. The present approach provides a technique for coating these elements on their inwardly facing surfaces 32 and 34, respectively, with a heat rejection coating that reduces the temperature reached by as much as 300° F.

Figure 4:
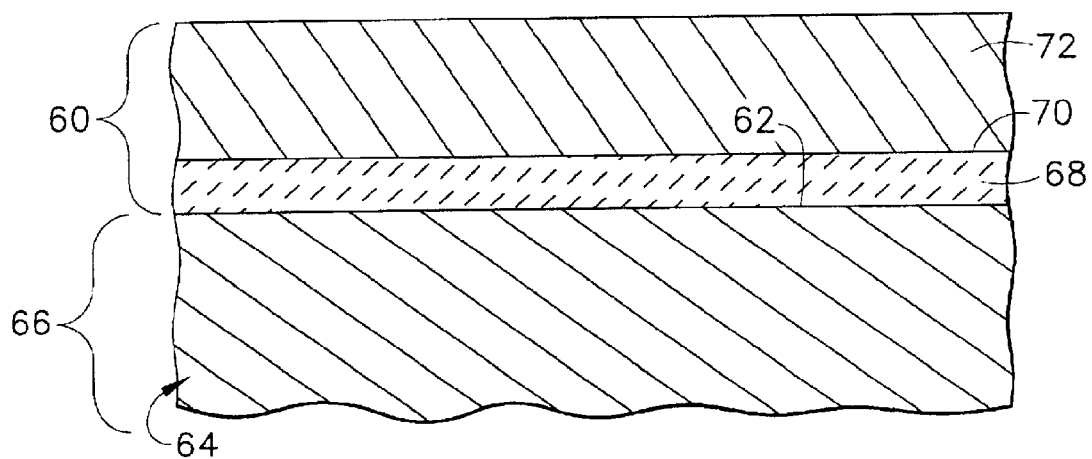
FIG. 4 is a schematic sectional view of a coated component.

FIG. 3 depicts a preferred approach for applying a heat-rejection coating, and FIG. 4 (which is not drawn to scale) shows such a heat-rejection coating 60 deposited on a surface 62 of a metallic component 64, which serves as a substrate 66 for the heat-rejection coating 60. The metallic component 64 is supplied, numeral 40. The metallic component 64 is preferably a component of a gas turbine engine, such as the exhaust nozzle convergent flap 24 or the exhaust nozzle convergent seal 28. The metallic component 64 is preferably made of a nickel-base superalloy or a cobalt-base alloy. A nickel-base alloy is one having nickel present in a greater percentage by weight than any other element. A nickel-base superalloy is a nickel-base alloy that is strengthened by the precipitation of gamma prime phase or a related phase. Nickel-base superalloys are known in the art. A preferred nickel-base superalloy is Rene$^R$ 41, having a nominal composition in weight percent of from about 18 to about 20 percent chromium, from about 9 to about 10.5 percent molybdenum, from about 10 to about 12 percent cobalt, from about 1.4 to about 1.8 percent aluminum, from about 3 to about 3.3 percent titanium, about 5 percent maximum iron, balance nickel, minor elements, and impurities. A cobalt-base alloy is one having cobalt present in a greater percentage by weight than any other element. A preferred cobalt-base alloy is HS188, whose nominal composition, in weight percent is 22 percent nickel, 41.5 percent cobalt, 22 percent chromium, 14 percent tungsten, 0.1 percent carbon, 0.35 percent silicon, 0.1 percent lanthanum, balance minor amounts of other elements. The present approach may be used with other components and other alloys than those set forth above.

The component surface 62 of the component 64 is optionally but preferably pre-treated, numeral 42, to form a pre-treated component surface. There are three types of pre-treatments that are of primary interest, and they may be used independently or together in any operable combination. The following discussion will address all three pre-treatments used in the order indicated in FIG. 3, the most preferred pre-treatment approach.

In the first pre-treatment, the component surface 62 is polished, numeral 44, to remove any materials that may be present from previous processing of the component 64. The polishing is preferably accomplished using an air grinder with a commercially available Scotch Brite$^R$ pad. This polishing removes any pre-existing grease, soot, and oxide scale and desirably produces a surface Ra value of less than about 15.

In a second pre-treatment, the component surface 62 is pre-oxidized, numeral 46. The pre-oxidation 46 produces a uniform oxide coating on the component surface 62, suitable for adhesion with the subsequent coating layers. A preferred pre-oxidation 46 is at a temperature of from about 1100° F. to about 2150° F., most preferably at 1400° F. for 16 hours.

In a third pre-treatment, a ceramic barrier coating 68 is applied to the component surface 62, numeral 48. The application 48 of the ceramic barrier coating 68 may be accomplished by any operable technique. The application is preferably performed by air-assisted spraying, numeral 50, of a ceramic-barrier-coating mixture onto the component surface 62. The ceramic-barrier-coating mixture preferably includes fine particles of a ceramic material such as lanthanum and cerium, dispersed in an organic carrier material. (As used herein, "ceramic material" includes both materials that are initially a ceramic, and materials that are ceramic precursors and become ceramics during subsequent processing.) A suitable commercially available material that may be used as the ceramic-barrier-coating mixture is Engelhard Liquid Metal A4841, available from Engelhard Corporation, East Newark, N.J. The Liquid Metal A4841 comprises about 1–5 percent by weight rare earth compounds, preferably lanthanum and/or cerium, as the fine particles of ceramic material, and 30–40 percent by weight toluene, 5–10 percent cyclohexane, 5–10 percent Stoddard Solvent, 5–10 percent dipentene, 1–5 percent terpene hydrocarbon, 1–5 percent rosin, and 10–20 percent essential oils as the organic carrier.

Figure 5:
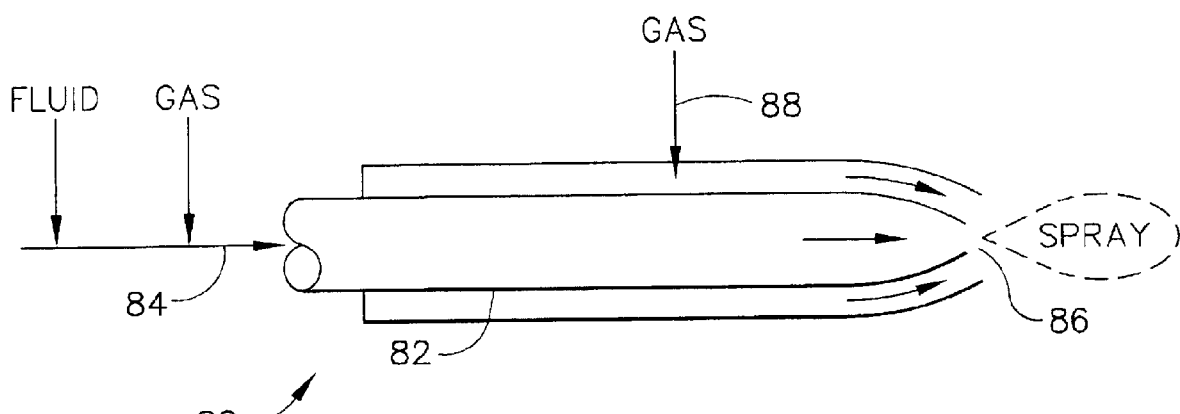
FIG. 5 is a schematic sectional view of an air-spray apparatus.

The air-assisted spraying 48 is accomplished with an air-spray apparatus 80, such as that depicted schematically in FIG. 5. The air-spray apparatus 80 includes a hollow tube 82 into which a flow 84 of the fluid mixture to be air sprayed is introduced under pressure. The flow 84 expands through an expansion nozzle 86 and vaporizes to form a mist of the air-sprayed material. The mist is actually formed from the vaporized organic carrier, and the solid particles of the ceramic material are carried with the flow of the mist to the surface being air sprayed. Additional gas or fluid may be introduced through an assist line 88 to shape the flow exiting the nozzle 86.

The air-spraying is performed in air, without heating either the flow of the mixture being sprayed or the substrate. It is readily performed quickly and inexpensively on components 64 of any size, using the easily operated apparatus 80. Air-assisted spraying is contrasted with other types of deposition techniques often used to deposit coatings on gas turbine components, such as plasma spraying, vapor phase aluminiding, and chemical vapor deposition, all of which are performed at elevated temperatures and in most cases in special atmospheric chambers or devices. Air-assisted spraying is also contrasted with electrodeposition and dipping techniques, which require that the article be immersed in a liquid medium. Alternative approaches which are within the scope of the present invention are airless spraying, brushing, and decal transfer application.

After the air-assisted spraying 50 is complete, the ceramic-barrier-coating mixture, now deposited on the surface 62 of the component 64, is dried, numeral 52, preferably in air at room temperature. It is usually preferred to apply several thin layers, such as three passes, of the mixture being applied, allowing the as-applied mixture to dry between coats.

The resulting ceramic barrier coating 68 may be of any operable thickness, but is preferably quite thin. The ceramic barrier coating material is most preferably present in an amount of from about 0.0005 to about 0.0015 grams per square inch of the pre-treated component surface 62.

This completes the optional pre-treatment 42. It is preferred to use the polishing 44 to remove pre-existing contaminants from the surface 62. It is preferred to use the pre-oxidation 46 to provide a uniformly oxidized surface for the application of the coatings. It is preferred to deposit the ceramic barrier coating 68 to provide a wettable surface for the application of the reflective-coating mixture, to prevent interdiffusion of the subsequently applied reflective coating with the base metal of the component 64, and to provide temperature stability for the reflective-barrier coating.

A reflective-coating mixture is thereafter air sprayed, numeral 54, onto the component surface 62, or, if the pre-treatment is used, the pre-treated component surface 62 or a surface 70 of the ceramic barrier coating 68 if the step 48 is used. The reflective-coating mixture comprises fine particles of a metallic pigment, such as platinum, gold, palladium, and alloys thereof, mixed with an organic reflective-coating-mixture carrier. A platinum/gold blend is preferred as the metallic pigment. A suitable platinum-containing reflective-coating mixture is Engelhard Spray Platinum for Ceramics APP101A, available from Engelhard Corporation, East Newark, N.J. The APP101A comprises about 5–20 percent by weight metallo-organic platinum compounds, and 10–20 percent by weight essential oils, 10–20 percent by weight ethyl acetate, 10–20 percent by weight methyl benzoate, 5–10 percent by weight camphor, 5–10 percent by rosin, 5–10 percent by weight terpentine, 1–5 percent by weight benzyl acetate, and 1–5 percent by weight bismuth compounds as the organic carrier. A suitable gold-containing reflective coating mixture is Liquid Bright Gold for Spraying 991BD, available from Engelhard Corporation, East Newark, N.J. The 991BD material comprises about 5.5 percent by weight (total) of platinum and gold compounds, and 20–30 percent by weight ethyl acetate, 20–30 percent by weight turpentine, 10–20 percent by weight heptane, 5–10 percent by weight cyclohexane, 5–10 percent by weight terpinsol, and less than 2 percent by weight of each of butyl carbitol acetate, propyl acetate, metallo-organic vanadium compounds, and essential oils. The air-assisted spraying approach and apparatus 80 described earlier are preferably used, and that description is incorporated here. It is preferred to apply the reflective-coating mixture in several layers, allowing each layer to air dry before the next layer is applied.

The component 64 having the reflective-coating mixture thereon is thereafter fired to form a reflective coating 72, numeral 56. The firing 56 is performed by heating the reflective-coating mixture to an elevated temperature in air. A preferred temperature range is from about 1100° F. to about 2150° F., and a most-preferred firing 56 is at 1400° F. for one hour. The preferred approach is to heat the entire component 64 and the applied coating 72 (and the coating 68, where present) to the firing temperature.

The reflective coating 72 is applied in an amount such that the total amount of the reflective coating 72 and the ceramic barrier coating 68 (where used) are together present in an amount of from about 0.00325 to about 0.0625 grams per square inch of the component surface 62. That is, the reflective coating 72 is preferably present in an amount of from about 0.00275 to about 0.0475 grams per square inch of the component surface 62.

Figure 6:
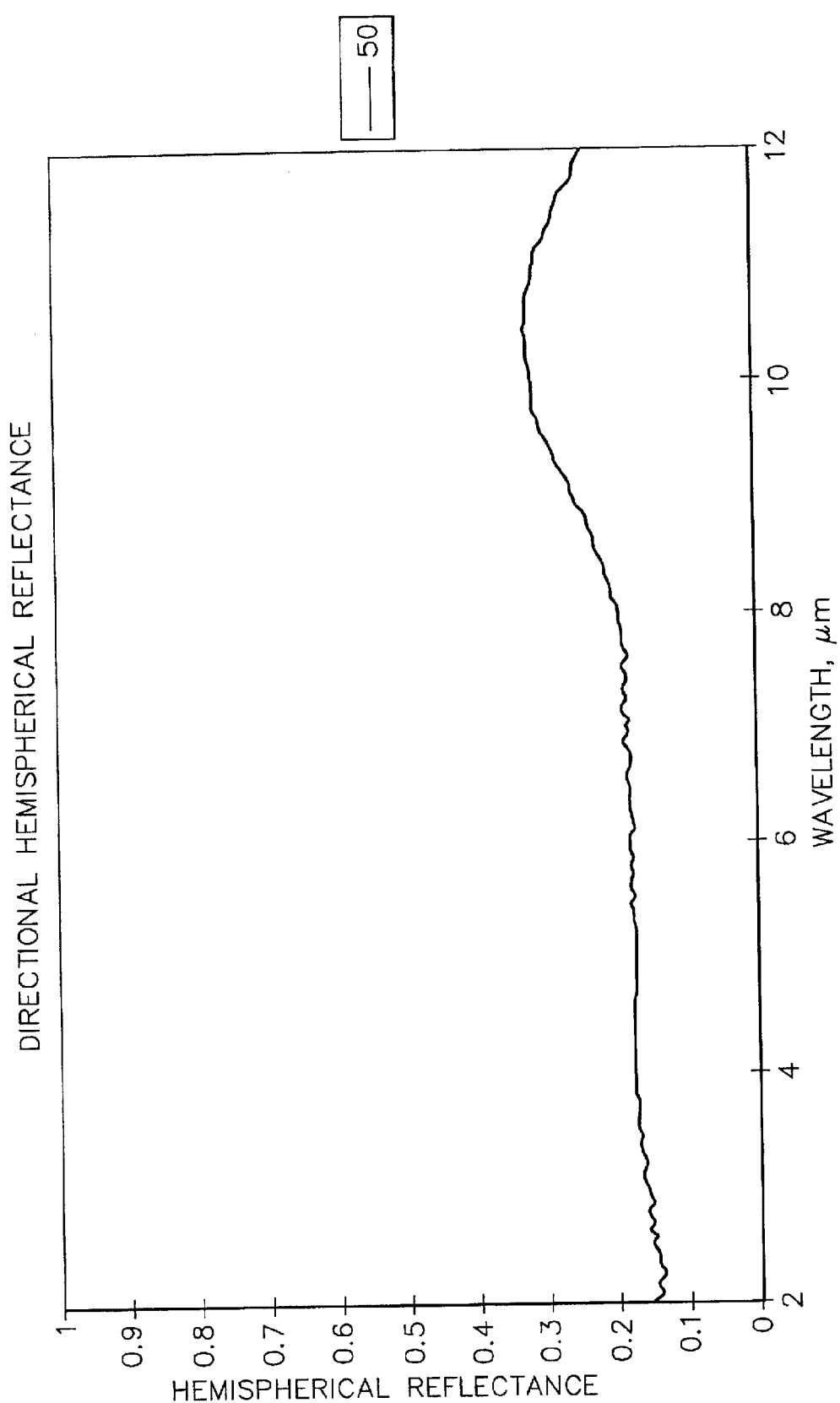
FIGS. 6–9 are graphs of hemispherical reflectance at a 50 degree reflection angle for As-received Rene$^R$ 41 exposed to 1600° F. for 50 hours (FIG. 6), As-received Rene$^R$ 41 plus fired reflective coating (FIG. 7), As-received Rene$^R$ 41 plus fired reflective coating and ceramic barrier coating (FIG. 8), and Polished and pre-oxidized Rene$^R$ 41 plus fired reflective coating and ceramic barrier coating, after exposure to 1600° F. for 50 hours (FIG. 9).
Figure 7:
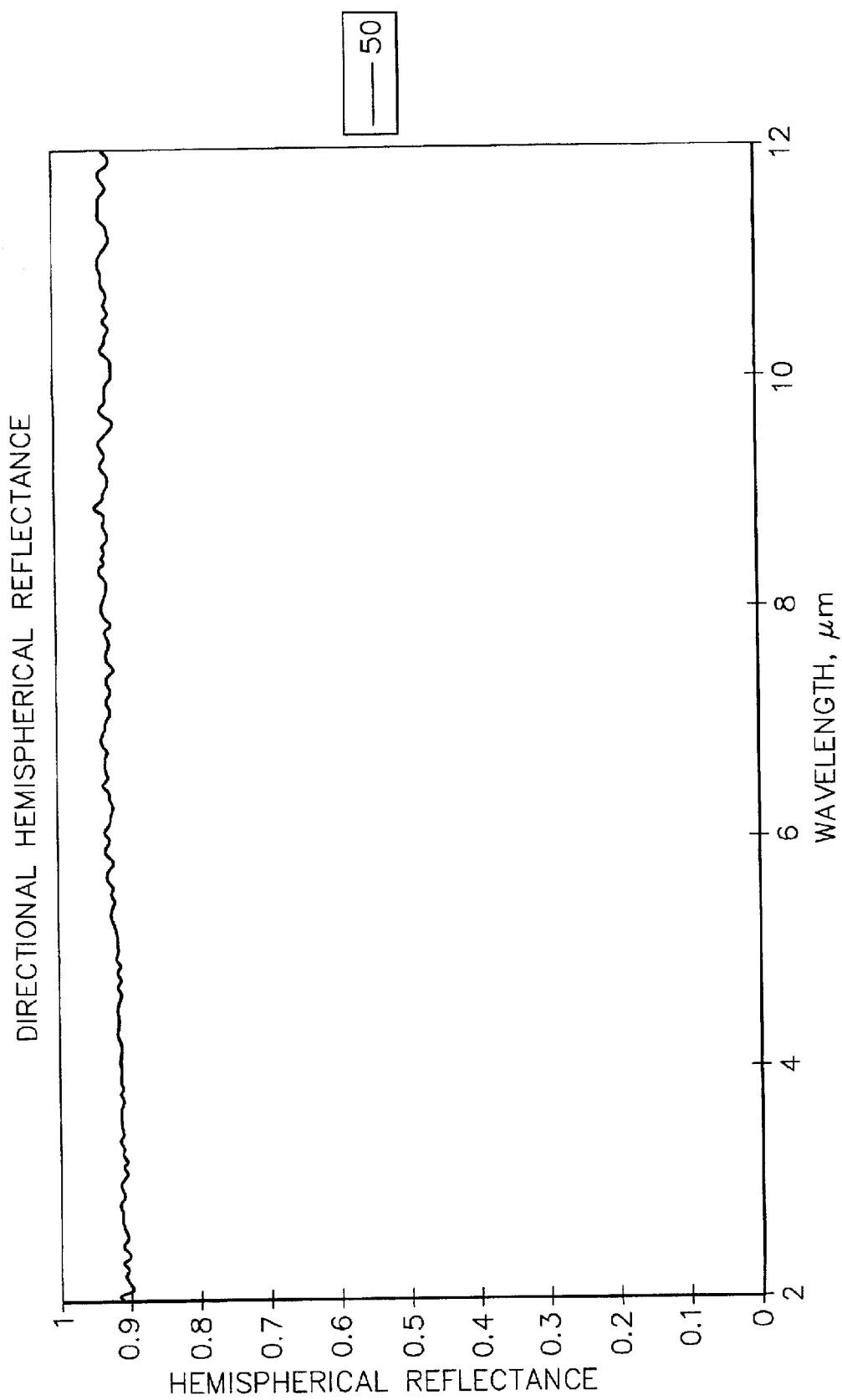
Figure 8:
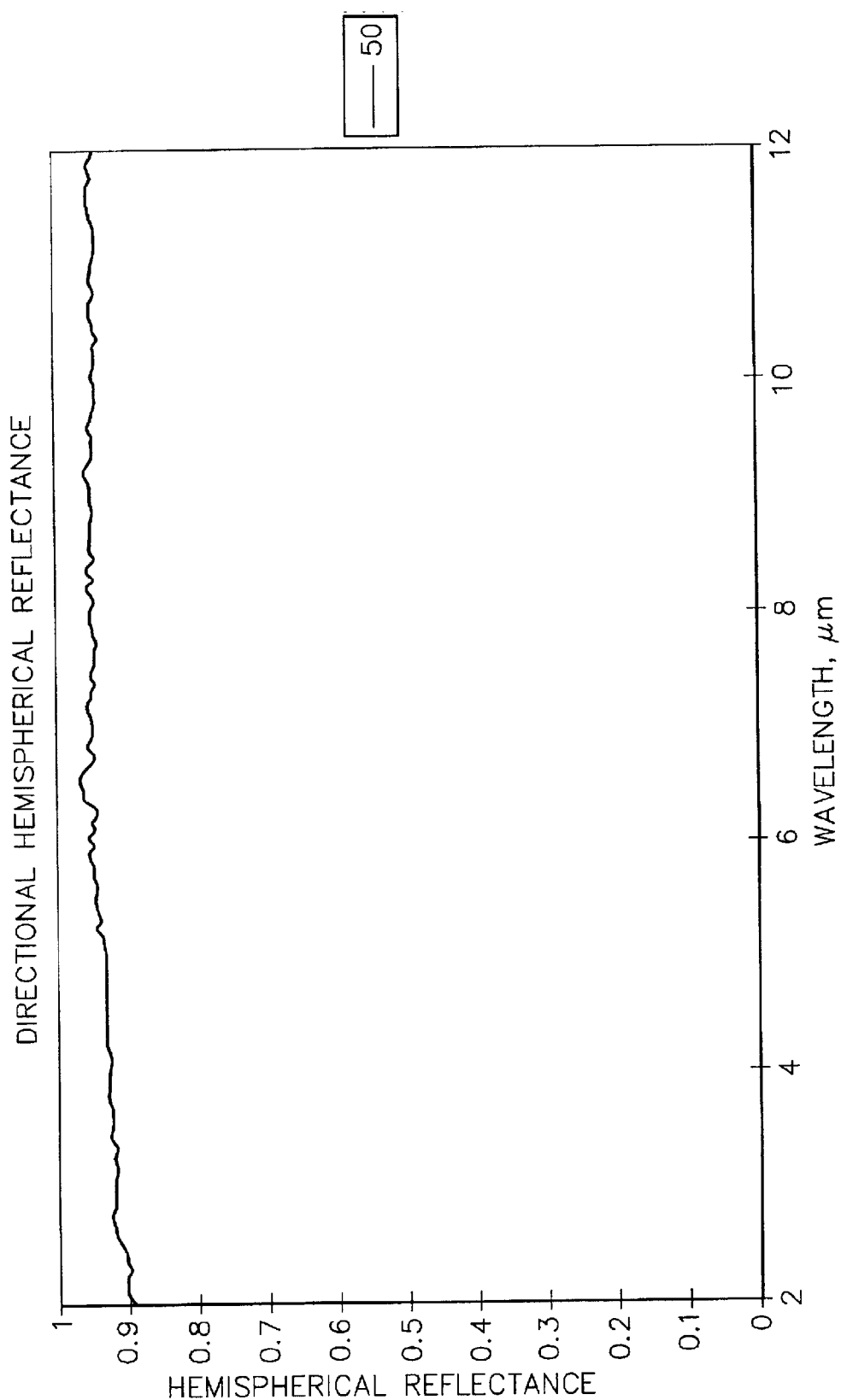
Figure 9:
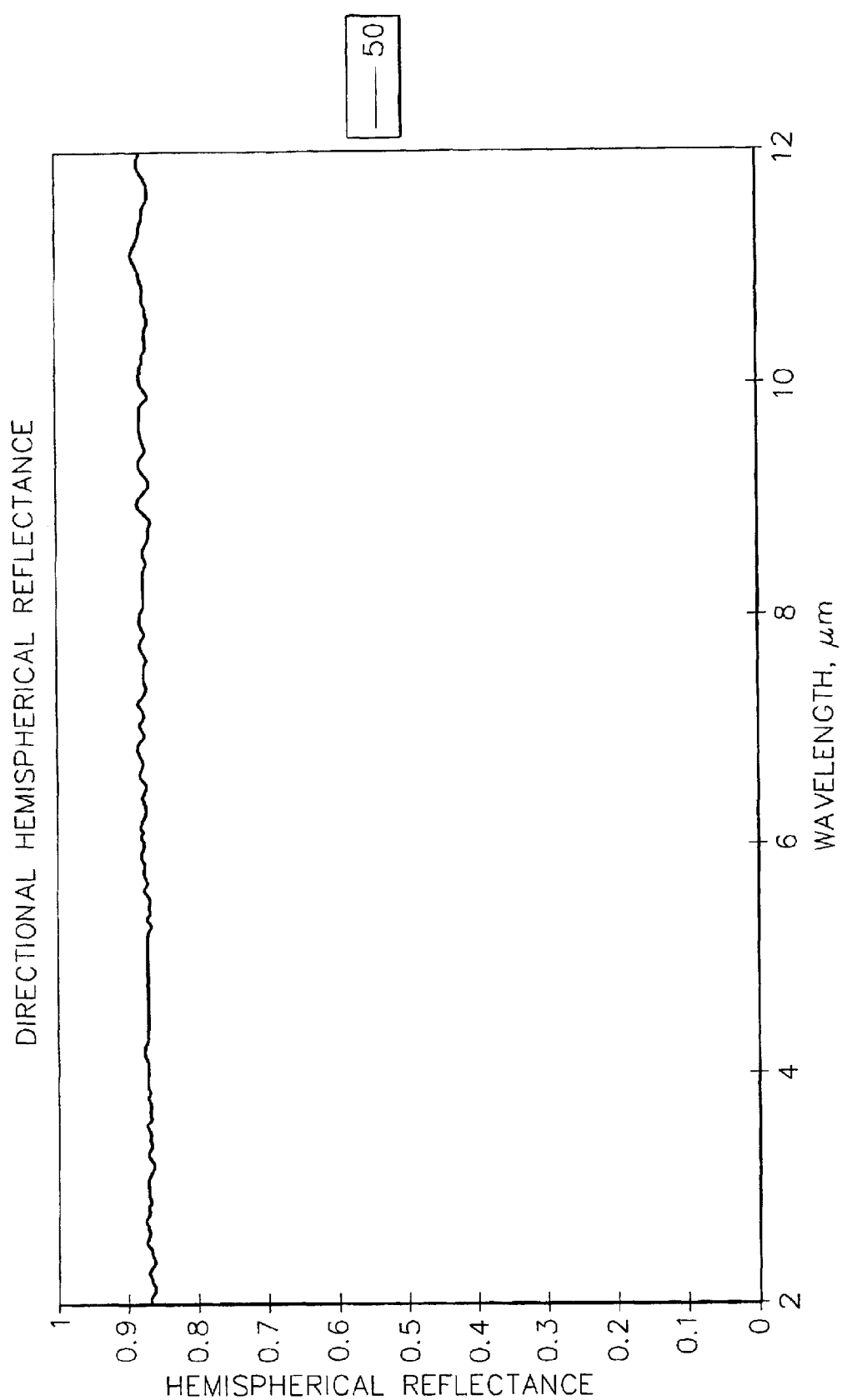

The present approach has been reduced to practice by the procedure discussed above and the performance of the coated components tested. FIGS. 6–9 present some illustrative test results for these coating components. These figures depict the hemispherical reflectance at an angle of 50 degrees as a function of wavelength in micrometers, in the infrared. As seen in FIG. 6, uncoated Rene$^R$ 41 exposed to 1600° F. for 50 hours has a low reflectance over the entire infrared spectrum. This low reflectance leads to a large heat absorption and a consequent elevated temperature. Much higher reflectance is achieved when only the reflective coating 72 is applied and fired, FIG. 7, and when both the ceramic barrier coating 68 and the reflective coating 72 are applied and fired, FIG. 8. FIG. 9 illustrates the reflective performance of the Rene 41 which has received the preferred treatment of surface polish, pre-oxidation, ceramic barrier coating 68, and reflective coating 72, and after exposure to 1600° F. for 50 hours. A comparison of the results of FIGS. 6 and 9 shows the significant improvement in reflective performance achieved using the preferred approach, which translates into reduced temperature of the engine component during service.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of applying a heat-rejection coating, comprising the steps of:
   supplying a metallic component of a gas turbine engine, wherein the metallic component is selected from the group consisting of an exhaust nozzle convergent flap and an exhaust nozzle convergent seal;
   applying a reflective-coating mixture onto the component, wherein the reflective-coating mixture comprises a metallic pigment and a reflective-coating-mixture carrier, and wherein the step of applying is accomplished by a method selected from the group consisting of air-assisted spraying, airless spraying, brushing, and decal transfer; and
   firing the component having the reflective-coating mixture thereon to form a reflective coating on the component.

2. The method of claim 1, wherein the step of applying the reflective-coating mixture includes the step of
   air-assisted spraying the reflective-coating mixture.

3. The method of claim 1, wherein the step of supplying the metallic component includes the step of
   supplying the component made of a nickel-base superalloy.

4. The method of claim 1, wherein the step of applying the reflective-coating mixture includes the step of
   supplying the reflective-coating mixture including the metallic pigment selected from the group consisting of platinum, gold, palladium, and alloys thereof.

5. The method of claim 1, wherein the step of applying the reflective-coating mixture includes the step of
   supplying the reflective-coating mixture including an organic reflective-coating-mixture carrier.

6. The method of claim 1, wherein the step of applying the reflective-coating mixture includes a step of
   air-assisted spraying the reflective-coating mixture such that the reflective coating is present in an amount of from about 0.00275 to about 0.00475 grams per square inch of a component surface of the component.

7. The method of claim 1, further including an additional step, after the step of supplying and before the step of applying the reflective-coating mixture, of
   applying a ceramic barrier coating onto the component, and wherein the step of applying the reflective-coating mixture includes the step of
      applying the reflective-coating mixture onto the ceramic barrier coating applied to the component.

8. The method of claim 7, wherein the step of applying the ceramic barrier coating includes the step of
   applying the ceramic barrier coating made of a ceramic material selected from the group consisting of lanthanum and cerium.

9. The method of claim 7, wherein the step of applying the ceramic barrier coating includes the step of
   applying a ceramic-barrier-coating mixture such that the reflective coating and the ceramic barrier coating are together present in an amount of from about 0.00325 to about 0.00625 grams per square inch of a component surface of the component.

10. A method of applying a heat-rejection coating, comprising the steps of:
    supplying a metallic component of a gas turbine engine;
    applying a ceramic barrier coating onto the component, wherein the step of applying the ceramic barrier coating includes the steps of
       air-assisted spraying the ceramic-barrier-coating mixture onto the component, and
       drying the ceramic-barrier-coating mixture;
    applying a reflective-coating mixture onto the ceramic barrier coating applied to the component, wherein the reflective-coating mixture comprises a metallic pigment and a reflective-coating-mixture carrier, and wherein the step of applying is accomplished by a method selected from the group consisting of air-assisted spraying, airless spraying, brushing, and decal transfer; and
    firing the component having the reflective-coating mixture thereon to form a reflective coating on the component.

11. The method of claim 1, further including an additional step, after the step of supplying and before the step of applying the reflective-coating mixture, of
    polishing a component surface of the component.

12. The method of claim 1, further including an additional step, after the step of supplying and before the step of applying the reflective-coating mixture, of
    pre-oxidizing a component surface of the component.

13. The method of claim 1, further including additional steps, after the step of supplying and before the step of applying the reflective-coating mixture, of
    polishing a component surface of the component, and thereafter
    pre-oxidizing the component surface.

14. The method of claim 1, further including additional steps, after the step of supplying and before the step of applying the reflective-coating mixture, of
    polishing a component surface of the component, thereafter
    preoxidizing the component surface, and thereafter
    applying a ceramic barrier coating onto the component surface.

15. A method of applying a heat-rejection coating, comprising the steps of:
    supplying a metallic component of a gas turbine engine, the component being made of a nickel-base superalloy and having a component surface;
    pre-treating the component surface of the component to form a pre-treated component surface, wherein the step of pre-treating the component surface includes the step of
       polishing the component surface, thereafter
       pre-oxidizing the component surface, and thereafter
       applying a ceramic barrier coating onto the component surface, wherein the step of applying the ceramic barrier coating includes the steps of air-assisted spraying a ceramic-barrier-coating mixture onto the component, and drying the ceramic-barrier-coating mixture; thereafter air-assisted spraying a reflective-coating mixture onto the pre-treated component surface, the reflective-coating mixture comprising a metallic pigment and a reflective-coating-mixture carrier; and firing the component having the coating mixture thereon.

16. A method of applying a heat-rejection coating, comprising the steps of:

supplying a metallic component of a gas turbine engine, the component being made of a nickel-base superalloy and having a component surface;

pre-treating the component surface of the component to form a pre-treated component surface, and step of pre-treating including the steps of
polishing the component surface, thereafter
pre-oxidizing the component surface, thereafter
air-assisted spraying a ceramic-barrier-coating mixture onto the component surface, and thereafter
drying the ceramic-barrier-coating mixture to form a ceramic barrier coating on the component, the ceramic barrier coating being present in an amount of from about 0.0005 to about 0.0015 grams per square inch of the pre-treated component surface; thereafter air-assisted spraying a reflective-coating mixture onto the pre-treated component surface, the reflective-coating mixture comprising
a metallic pigment selected from the group consisting of platinum, gold, palladium, and alloys thereof, and
an organic reflective-coating-mixture carrier; and firing the component having the reflective-coating mixture thereon to form a reflective coating, the reflective coating and the ceramic barrier coating being together present in an amount of from about 0.00325 to about 0.00625 grams per square inch of the component surface.

* * * * *